United States Patent

[11] 3,533,488

| [72] | Inventors | Jack F. Engle;<br>William Glen Jeakle, Auburn, Indiana |
|---|---|---|
| [21] | Appl. No. | 728,241 |
| [22] | Filed | May 10, 1968 |
| [45] | Patented | Oct. 13, 1970 |
| [73] | Assignee | Borg-Warner Corporation<br>Chicago, Illinois<br>a corporation of Delaware |

[54] LUBRICANT DIFFERENTIAL MECHANISM
6 Claims, 3 Drawing Figs.

[52] U.S. Cl. ............................................. 184/11,
74/710.5
[51] Int. Cl. ............................................. F16n 7/26
[50] Field of Search ............................ 184/6(U), 11;
74/467, 711, 710.5

[56] References Cited

UNITED STATES PATENTS

| 2,821,096 | 1/1958 | Lyeth | 74/711 |
| 3,055,234 | 9/1962 | O'Brien | 74/711 |
| 3,182,527 | 5/1965 | Bryan | 184/11X |
| 3,211,022 | 10/1965 | Anderson | 74/711 |
| 3,264,901 | 8/1966 | Ferbitz et al. | 74/711 |
| 3,429,400 | 2/1969 | Engle et al. | 184/11 |

FOREIGN PATENTS

| 1,150,593 | 6/1963 | Germany | 184/11 |

Primary Examiner—Manuel A. Antonakas
Attorneys—Donald W. Banner, Lyle S. Motley, C. G. Stallings and William S. McCurry ABSTRACT: A limited slip differential mechanism including a gear case having gearing therein and having differential side gears mounted in the casing with a clutch structure on one side thereof operatively mounted between one of the side gears and the gear casing and including preload biasing means adapted to provide a predetermined engaging force on said conical clutch means. The differential mechanism includes a lubricant deflecting means comprising a radially extending baffle adapted to direct lubricant toward the conical clutch structure.

Patented Oct. 13, 1970

3,533,488

INVENTORS
WILLIAM G. JEAKLE
JACK F. ENGLE

BY Robert L. Zieg

ATTORNEY 3,533,488

LUBRICANT DIFFERENTIAL MECHANISM

SUMMARY OF THE INVENTION

In limited slip differential mechanisms wherein a clutch structure either conical or disc is used, adequate lubrication has been found to be essential. Further, in the case where a clutch structure to retard differentiation is used only on one side of the gearing so that the casing may be made more compact (to fit in to reduced space requirements of certain vehicles), lubrication becomes even more critical. To facilitate lubrication, a lubricant-deflecting structure is provided on the spring preload means which helps deflect lubricant toward the clutch structure. This lubricant-deflecting means on the spring preload structure has been more completely described and claimed in co-pending application Ser. No. 686,935, filed Nov. 30, 1967 of common assignee, now U.S. Pat. No. 3,495,298.

The present invention further provides adjacent the entry port, radially positioned opposite an axially extending lubricant groove provided in the cone clutch surface of the casing, a radially extending baffle integral with the differential case which is adapted to deflect lubricant into the lubricant groove, and further enhance lubrication of the conical clutch structure.

DETAILED DESCRIPTION OF THE DRAWINGS.

Figures 1, 2, 3:
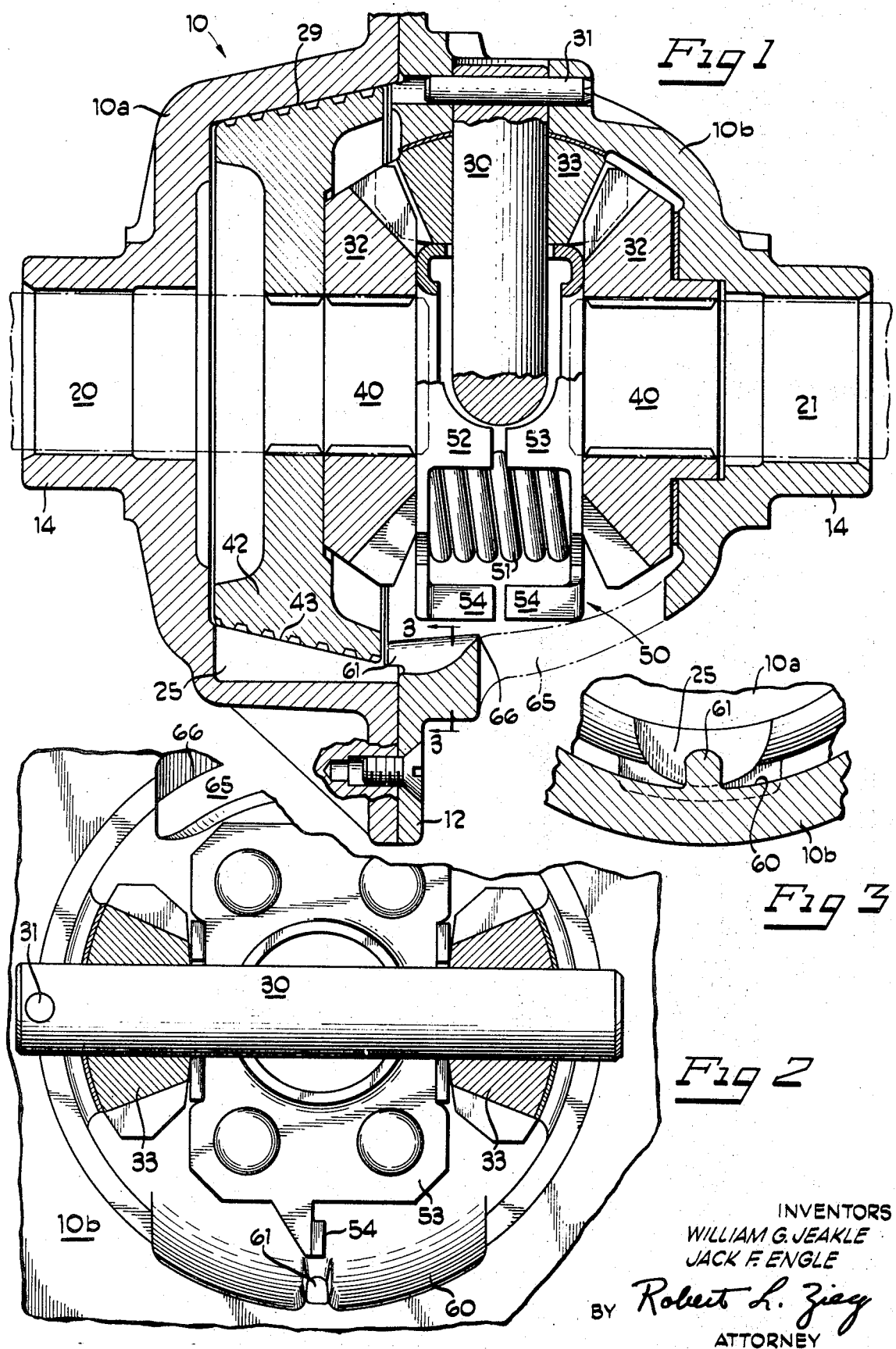
FIG. 1 is a cross-sectional view of a differential mechanism constructed in accordance with the principles of the present invention.
FIG. 2 is a cross-sectional view taken along the section line 2-2 of FIG. 1.
FIG. 3 is a partial sectional view taken along the line 3-3 of FIG. 1.

Referring to FIG. 1, there is illustrated a differential mechanism including a casing 10 formed in two mating sections 10a and 10b having an integral radially extending flange 12 adapted to be connected to a ring gear (not illustrated) the ring gear to be driven from the vehicle drive shaft in a manner familiar to those skilled in the art. Casing 10 is provided with a pair of hub sections 14 on either side thereof having openings therein adapted to receive a pair of rotary output shafts or axles 20 and 21 which are adapted to be connected to the driving wheels.

The casing 10 further includes a clutch mechanism interposed between the casing 10 and one of the axles 20. The illustrated embodiment comprises a frusto-conical clutch surface 24 and a mating frusto-conical clutch member 42 which together develop frictional resistance to differential action to provide the limited slip friction. An axially extending lubricating groove 25 is formed in the housing and intersects the frusto-conical surface 24 as clearly seen in FIGS. 1 and 3.

A differential crosspin or pinion pin 30 is provided extending through the casing 10 and is held in place by means of a roll pin 31, for example. A pair of side gears 32 are provided which mesh with a pair of differential pinion gears 33 (only one of which is illustrated in the drawing in FIG. 1 for clarity), the differential pinion gears 33 being rotatably journaled on differential crosspin 30.

The inner ends of shafts 20 and 21 include a splined section 40 being received by complementary splined side gears 32 to provide a driving connection between the side gears 32 and shafts 20 and 21. A clutch member 42 is provided in the casing having a generally external frusto-conical grooved clutch surface 43 thereon adapted to engage the frusto-conical clutch surface 24 provided in the casing 10. The clutch member 42 also includes complementary splined members and is received on the splined section 40 on shaft 20 to provide a driving connection between the clutch member 42 and the shaft 20.

A clutch preload assembly 50 is provided between side gears 32. The preload assembly includes coil springs 51 and spring retaining members 52 and 53. Lubricant deflecting tabs 54 are provided on the spring retaining members 52 and 53.

The clutch preload assembly 50 provides a predetermined separating force between the side gears 32 and thus a predetermined minimum engaging force for the clutch which comprises conical clutch surfaces 43 and 24 whereby a certain predetermined resistance to differentiation within the differential mechanism is provided. Further, the meshing teeth on the pinions and side gears respectively are so designed that there is a positive tooth pressure tending to increase the engaging force on the clutch when torque is applied to the casing. This feature is more particularly described in the Lyeth, Jr. U.S. Pat. No. 2,821,096.

A recessed portion 60 is provided in the casing section 10b as best illustrated in FIG. 2. Disposed in the center of the recessed portion 60 is a radially extending baffle 61. The recessed portion 60 and the baffle 61 are preferably cast in the casing. The baffle 61 cooperates with the lubricant-deflecting tabs 54 on the spring retaining means to deflect lubricant toward the clutch surfaces 43, 24. As can be seen in FIG. 3, the baffle 61 is radially positioned opposite the axially extending lubricating groove 25 to thereby deflect lubricant into the lubricating groove 25 to provide a reservoir of fluid in the lubricating groove 25.

Further, there is provided in the casing 10 an entry port 65 which is provided to allow flow of lubricating fluid from the housing in which casing 10 is mounted in the vehicle into the interior of the differential casing 10 to provide lubricant to the clutch and gear surfaces. As can be seen in FIG. 2 in which port 65 is shown, port 65 is generally rectangular in shape. It should be noted that port 65 is located in the casing on the opposite side from baffle 61 as shown in FIG. 2 but is illustrated near baffle 61 in FIG. 1 to simplify the FIG. 1 view. The port 65 and casing 10b define a lip indicated at 66 which is radially disposed closer to the center of rotation of the side gears and shafts 20 and 21 than is the major area of the clutch surfaces 24 and 23. Thus as the differential casing 10 rotates as the vehicle is operating, the lip 66 with the aid of centrifugal force will tend to form a fluid reservoir within the interior of the casing 10, the fluid reservoir having fluid which will cover the major portion of the clutch surfaces 43 and 24 in the vicinity of port 65 thus also provide adequate lubrication for the clutch surfaces.

From the above it will be apparent that the improved differential mechanism herein described conveniently provides a differential mechanism with a limited slip function while using a structure on only one axle thereof so that one side of the casing 10 can be reduced in dimension to allow installation in limited space areas in vehicles. Further, increased lubrication to the conical clutch surfaces of the differential is provided by means of a radially extending baffle which is cast into the casing and therefore requires no machining processes to form it. Further, lubricant-deflecting means are used on the preload assembly to provide improved lubrication to the conical clutch structure. The lubricant-deflecting means on the preload assembly cooperates with the baffle integral with the casing to guide lubricating fluid into the groove 25.

The improved differential in operation will resist differential action of the differential in the manner described in the patent mentioned above. The preload assembly 50 provides an initial resistance to differential action and when one wheel overspins the torque thereby transmitted due to the separating action of the teeth of the gears 32, 33 provides an additional engaging force for the clutch surfaces 24, 43 which tends to lock up the differential gearing and provide a direct drive to each of the shafts 20 and 21.

Various of the features of the invention have been particularly shown and described; however, it should be obvious to one skilled in the art that various modifications may be made therein without departing from the scope of the invention.

We claim:

1. A limited slip differential mechanism comprising a gear case having gearing therein and including differential side gears mounted in the casing, clutch means operably associated with said side gears, preload biasing means engaging said gears to provide a predetermined engaging force for said clutch means, lubricant-deflecting means adjacent said clutch means and formed integral with said casing and extending radially inwardly thereof adapted to deflect lubricant in said casing toward said clutch means to provide lubrication for said clutch means.

2. A differential mechanism as claimed in claim 1 wherein said lubricant-deflecting means comprises a radially extending baffle cast in said casing.

3. A differential mechanism as claimed in claim 1 wherein said preload means comprises resilient means and retaining means for said resilient means and including additional lubricant-deflecting means integral with said retaining means.

4. A differential mechanism as claimed in claim 1 wherein said casing includes an inner cavity and having a lubricating groove extending axially along the inner cavity of said casing and adapted to deliver lubricating fluid to the clutch means, said integral lubricant-deflecting means being axially aligned with said lubricant groove and adapted to deflect lubricant into said groove.

5. A differential mechanism as claimed in claim 4 wherein said lubricant-deflecting means comprises a radially extending baffle cast in said casing.

6. A differential mechanism as claimed in claim 4 wherein said clutch means includes a clutch surface on said inner cavity of said casing and said lubricating groove extends axially along said clutch surface.